Jan. 24, 1956 J. R. CURRAN 2,732,172
VALVE
Filed Nov. 1, 1952 2 Sheets-Sheet 1
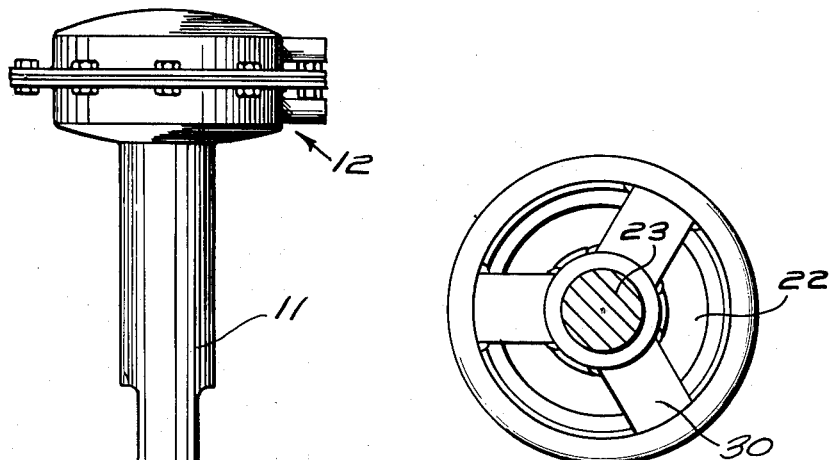
FIG. 4
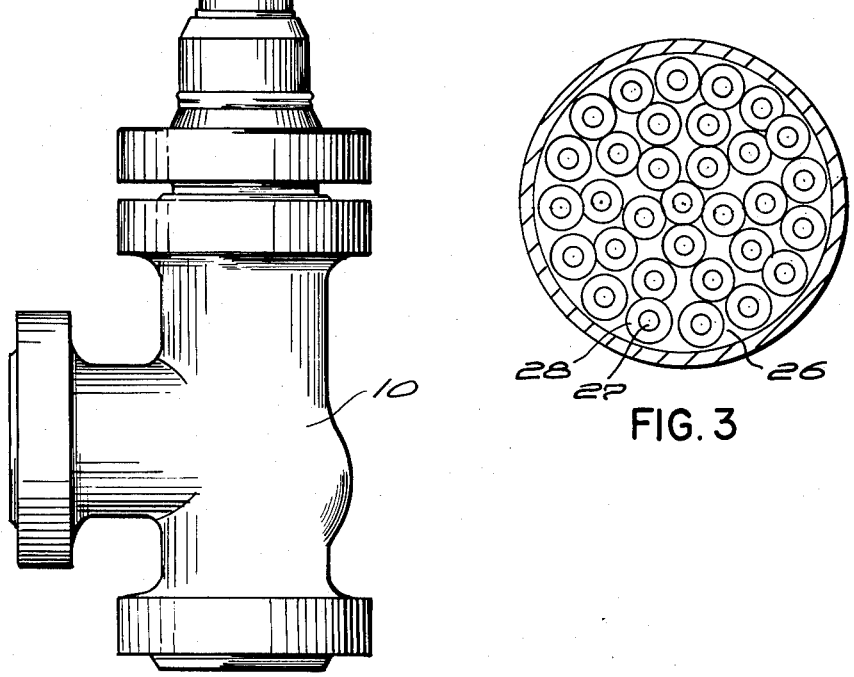
FIG. 3
FIG. 1
INVENTOR.
John R. Curran
BY
*Barlow & Barlow*
ATTORNEYS Jan. 24, 1956  J. R. CURRAN  2,732,172
VALVE
Filed Nov. 1, 1952  2 Sheets-Sheet 2

INVENTOR.
John R. Curran
BY
Barlow & Barlow
ATTORNEYS

United States Patent Office 2,732,172
Patented Jan. 24, 1956

2,732,172

VALVE

John R. Curran, Cranston, R. I., assignor to Hammel-Dahl Company, a corporation of Rhode Island Application November 1, 1952, Serial No. 318,224

1 Claim. (Cl. 251—282)

This invention relates to a valve.

In the operation of a valve where high liquid pressures are encountered at the time of movement of the plug from its seat, high lateral pressures are developed which tend to move the plug at right angles to its axis as withdrawn from the seat, and sometimes a chatter of substantial magnitude results.

In particular in valves of the type which are sometimes designated "convergent-divergent" (i. e. in which the fluid enters a port and converges from all points around the circumference of an annular seat upon the seat when the valve is opened, and may then diverge again after it has passed the seat) shock waves occur in the fluid at high velocities in the passage on the downstream side of the valve seat. These shock waves oscillate across the passage and if there are walls or surfaces of the valve plug exposed to the shock waves, chattering of the plug is likely to occur.

One of the objects of this invention is to so construct the valve plug that the valve plug will not chatter.

A more specific object of the invention is to provide for a minimum of vertical surface against which the lateral pressure may act.

With these and other objects in view, the invention consists of certain novel features of construction as will be more fully described and particularly pointed out in the appended claim.

In the accompanying drawings:

Figure 1 is an elevation of a valve of this construction;

Figure 3 is a section on line 3—3 of Figure 2; and

Figure 4 is a section on line 4—4 of Figure 1 showing the upper end of the plug.

Figure 2:
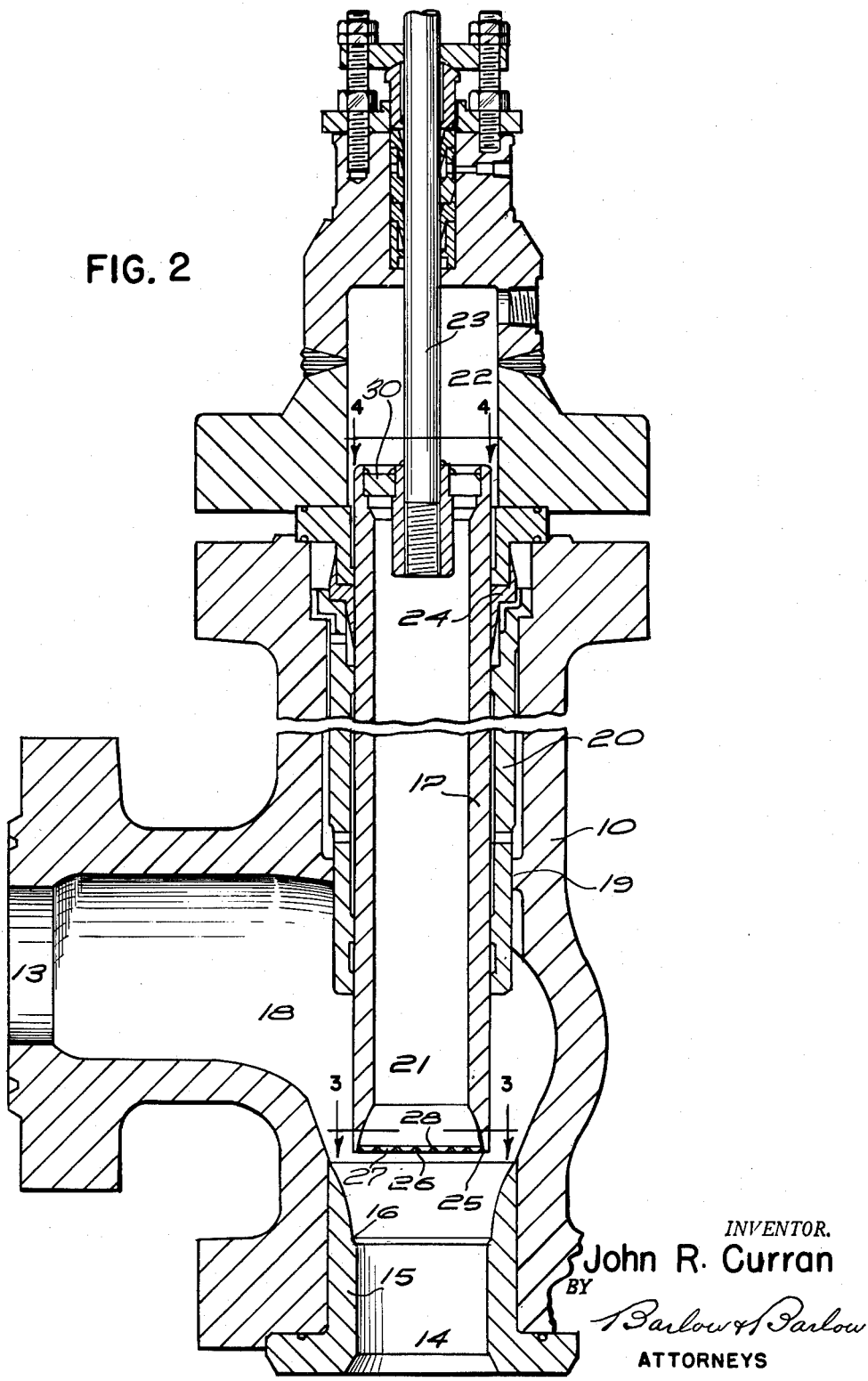
Figure 2 is a section on an enlarged scale showing the body and plug.

In the development of the seating end of a valve plug for certain characterized flows, i. e. in which there is a known relationship between the position of the valve stem and the area of flow through the valve, it was desirable to provide the plug with a pointed end, but as this would jump open intermediate its closed and open position, the shape was necessarily changed in order to minimize this tendency to uncontrolled movement. A flat bottom plug with an opening through its center to transmit fluid to its opposite end for control of the plug is desirable in order to have a constant balance in different positions of the plug, but this opening presented extended vertical surfaces against which lateral pressure might act to develop chatter or lateral movement of the plug, and in order to minimize this lateral pressure, I have provided a plate across the end of the plug with a plurality of openings, each with a beveled surface so that such pressures as act laterally will act along these beveled surfaces rather than against surfaces at right angles to the direction of the plug axis and which would tend to chatter the plug or cause it to act with considerable friction.

With reference to the drawings, 10 (Fig. 1) designates the body of the valve which has a superstructure 11 and an operating motor 12. The body 10 has an inlet opening 13 (Fig. 2) and a discharge opening 14. Within this discharge opening there is a sleeve 15 providing a seat 16 against which the valve plug 17 may engage to close the conduit 18 between the inlet opening 13 and discharge 14. The body is provided with a bore 19 in which there is a guiding sleeve 20 for the plug 17, while the plug has a central opening 21 extending through it to the chamber 22 with a stem 23 received in spider 30 fixed in the upper end of the plug and extending upwardly through the superstructure 11 to the motor 12 for actuation of the plug. A seal 24 of the type shown in Patent No. 2,613,962, October 14, 1952, seals the cylindrical surface of the plug 17 with reference to the body through which it slides, preventing movement of liquid upwardly along it.

The end of the plug 25 is so shaped that its end extends substantially at right angles to its axis, and in order to minimize lateral pressures at right angles to its axis, I have inserted a plate 26 which is provided with a multiplicity of holes 27 (see Fig. 3) and the surface of each hole leading from the outer surface of the plate to the inner surface is beveled as at 28 so that any lateral pressure is shunted off of the surface so as to minimize to a substantial extent the effective lateral pressure which occurs during the movement of the plug from open to closed position or from closed to open position, which is desirable where shock waves occur.

I claim:

A valve comprising a body having an inlet port and an outlet port with a conduit between said ports, an annular sealing seat along said conduit between said ports, a cylindrical guiding bore communicating with said conduit and having an axis extending perpendicular to said annular seat, a plug mounted for reciprocation in said cylindrical bore, said plug having an annular sealing surface adjacent one end to engage said annular seat and seat therewith and provide an axial portion of the plug exposed to the fluid at one port and a cross-sectional portion of the plug exposed to the fluid at the other port, said plug having an axial opening therethrough to expose its opposite end portions to the same pressure, a wall extending across the seating end of the axial opening of said plug and a plurality of openings in said wall each with its sides beveled.

References Cited in the file of this patent

UNITED STATES PATENTS

| | | |
|---|---|---|
| 1,111,244 | Wilson | Sept. 22, 1914 |
| 1,147,023 | Holmquest | July 20, 1915 |
| 1,769,621 | Chace | July 1, 1930 |
| 2,129,084 | Dorman | Sept. 6, 1938 |
| 2,450,944 | Eastman | Oct. 12, 1948 |
| 2,633,857 | MacDonald | Apr. 7, 1953 |